US012695994B2

(12) United States Patent
Wu et al.

(10) Patent No.: US 12,695,994 B2
(45) Date of Patent: Jul. 28, 2026

(54) PHOTOGRAPHING EXPOSURE METHOD AND APPARATUS FOR SELF-WALKING DEVICE

(71) Applicant: Beijing Roborock Innovation Technology Co., Ltd., Beijing (CN)

(72) Inventors: Zhen Wu, Beijing (CN); Jiabo Chen, Beijing (CN); Yang Yu, Beijing (CN)

(73) Assignee: Beijing Roborock Innovation Technology Co., Ltd., Beijing (CN)

( * ) Notice: Subject to any disclaimer, the term of this patent is extended or adjusted under 35 U.S.C. 154(b) by 237 days.

(21) Appl. No.: 18/547,063

(22) PCT Filed: Jun. 17, 2021

(86) PCT No.: PCT/CN2021/100719
§ 371 (c)(1),
(2) Date: Aug. 18, 2023

(87) PCT Pub. No.: WO2022/174539
PCT Pub. Date: Aug. 25, 2022

(65) Prior Publication Data
US 2024/0314445 A1 Sep. 19, 2024

(30) Foreign Application Priority Data
Feb. 18, 2021 (CN) .......................... 202110187659.2

(51) Int. Cl.
*H04N 23/73* (2023.01)
*B25J 9/16* (2006.01)
(Continued)

(52) U.S. Cl.
CPC ............ *H04N 23/73* (2023.01); *B25J 9/1697* (2013.01); *H04N 23/71* (2023.01); *H04N 23/76* (2023.01)

(58) Field of Classification Search
CPC ........ H04N 23/73; H04N 23/60; H04N 23/76; H04N 23/71; B25J 9/1697
See application file for complete search history.

(56) References Cited

U.S. PATENT DOCUMENTS

| | | | |
|---|---|---|---|
| 2019/0199902 A1 | 6/2019 | Cooper et al. | |
| 2021/0012142 A1 | 1/2021 | Yamaguchi | |
| 2021/0016449 A1* | 1/2021 | Wang .................... | B25J 9/1697 |

FOREIGN PATENT DOCUMENTS

| | | |
|---|---|---|
| CN | 106791475 A | 5/2017 |
| CN | 107137026 A | 9/2017 |

(Continued)

OTHER PUBLICATIONS

CN-109249390-B (Translated); CN-112567730-A (Translated); CN-107172353-A (Translated); CN-112351214-A (Translated).*

(Continued)

*Primary Examiner* — Lin Ye
*Assistant Examiner* — Steven Daniel Barry
(74) *Attorney, Agent, or Firm* — Calfee, Halter & Griswold LLP

(57) ABSTRACT

The present disclosure provides a photographic exposure method for a self-moving device. The method includes: detecting, based on a preset rule, brightness information of a target region in an image; adjusting a exposure parameter in response to the detected brightness information not meeting a preset condition; and performing, based on the adjusted exposure parameter, exposure in a localized region during image acquisition, the localized region including at least the target region.

14 Claims, 3 Drawing Sheets

(51) Int. Cl.
　　*H04N 23/71*　　　(2023.01)
　　*H04N 23/76*　　　(2023.01)

(56) References Cited

FOREIGN PATENT DOCUMENTS

| CN | 107172353 | A | * | 9/2017 | ........... H04N 23/611 |
|----|-----------|---|---|--------|-------------------------|
| CN | 107278490 | A |   | 10/2017 | |
| CN | 108521863 | A |   | 9/2018 | |
| CN | 109194884 | A |   | 1/2019 | |
| CN | 109922275 | A |   | 6/2019 | |
| CN | 111343387 | A |   | 6/2020 | |
| CN | 111742545 | A |   | 10/2020 | |
| CN | 112073645 | A |   | 12/2020 | |
| CN | 112312036 | A |   | 2/2021 | |
| CN | 112351214 | A | * | 2/2021 | ............. H04N 23/73 |
| CN | 112567730 | A | * | 3/2021 | ............. H04N 23/76 |
| CN | 109249390 | B | * | 4/2021 | ........... G06T 1/0014 |
| EP |  3429188 | A1 | * | 1/2019 | ............. H04N 23/71 |
| JP | 2004258430 | A | * | 9/2004 | ............. G03B 15/05 |
| JP |  4040139 | B2 | * | 1/2008 | ............. H04N 23/71 |
| WO | WO-2014129533 | A1 | * | 8/2014 | ............. H04N 23/73 |

OTHER PUBLICATIONS

WO-2014129533-A1 (Translated).*
JP-4040139-B2 (Translated).*
Extended European Search Report of application No. 21926255.7 dated Jan. 8, 2025.
International Search Report from PCT/CN2021/100719 dated Nov. 19, 2021.
Office action from Chinese Application No. 202210719491.X dated Aug. 3, 2023.
Office action from Chinese Application No. 202110187659.2 dated Oct. 9, 2021.

* cited by examiner

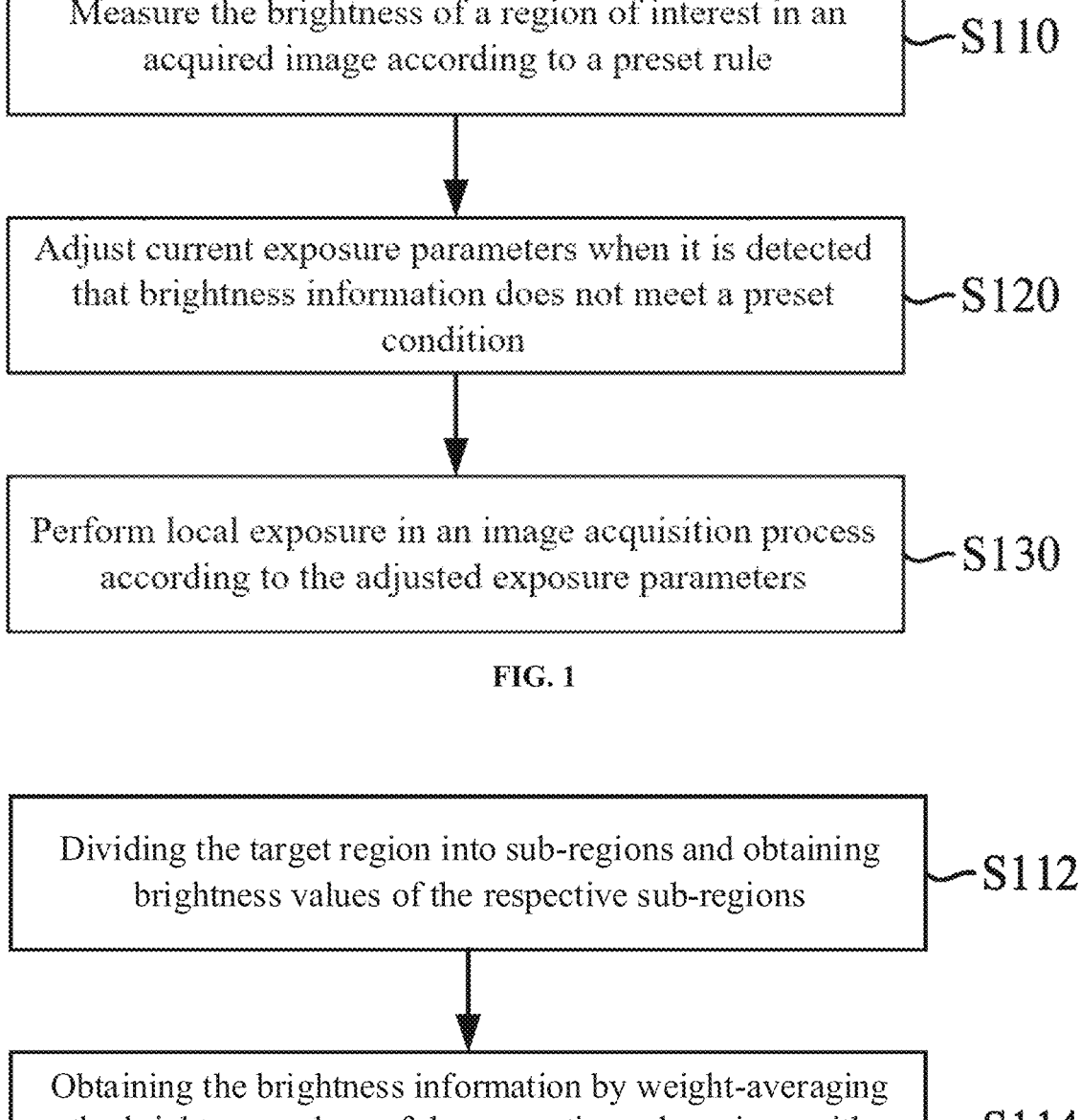

Measure the brightness of a region of interest in an acquired image according to a preset rule          ~S110

Adjust current exposure parameters when it is detected that brightness information does not meet a preset condition          ~S120

Perform local exposure in an image acquisition process according to the adjusted exposure parameters          ~S130

FIG. 1

Dividing the target region into sub-regions and obtaining brightness values of the respective sub-regions          ~S112

Obtaining the brightness information by weight-averaging the brightness values of the respective sub-regions with corresponding weight values of the respective sub-regions          ~S114

Image brightness
detection unit
410

Exposure parameter
adjustment unit
420

Local exposure unit
430

Photographic exposure apparatus
for self-moving device
400

PHOTOGRAPHING EXPOSURE METHOD AND APPARATUS FOR SELF-WALKING DEVICE

CROSS-REFERENCE TO RELATED APPLICATION

This application is the U.S. National phase application of International Application No. PCT/CN2021/100719, filed on Jun. 17, 2021, which claims priority of the Chinese Patent Application No. 202110187659.2, filed on Feb. 18, 2021, which are incorporated herein by reference in their entireties as a part of this application.

TECHNICAL FIELD

The present application relates to technologies of photographic exposure, and in particular, to a photographic exposure method for a self-moving device, a computing device, and a storage medium.

BACKGROUND

Existing self-moving devices such as sweepers equipped with separate cameras cannot work normally in insufficient-lighting or dark environments, thereby adversely affecting user experience.

SUMMARY

In one aspect, the present application provides a photographic exposure method for a self-moving device. The photographic exposure method for the self-moving device includes: detecting, based on a preset rule, brightness information of a target region in an acquired image; adjusting a current exposure parameter in response to the detected brightness information not meeting a preset condition; and performing, based on the adjusted exposure parameter, exposure in a localized region during image acquisition, the localized region including at least the target region.

In another aspect, the present application provides a computing device. The computing device includes: one or more processors, and a memory coupled to the one or more processors, the memory storing instructions that, when executed by the one or more processors, cause the one or more processors to perform the above-mentioned method.

In yet another aspect, the present application provides a non-transitory machine-readable storage medium, wherein the machine-readable storage medium stores executable instructions that, when executed, cause a machine to perform the above-mentioned method.

BRIEF DESCRIPTION OF THE DRAWINGS

Various other advantages and benefits will become apparent to those of ordinary skill in the art upon reading the following detailed description of the preferred embodiments. The accompanying drawings are only for the purpose of illustrating preferred embodiments and are not to be considered as limiting the present application. Throughout the accompanying drawings, the same reference numerals are used to designate the same components. In the accompanying drawings:

FIG. 1 is a flowchart of a photographic exposure method for a self-moving device according to an embodiment of the present application.

FIG. 2 is a flowchart of step S120 in FIG. 1 according to an example of the present application.

DETAILED DESCRIPTION

Exemplary embodiments of the present disclosure will be described in more detail below with reference to the accompanying drawings. Although exemplary embodiments of the present disclosure are shown in the accompanying drawings, it should be understood that the present disclosure may be implemented in various forms and should not be limited by the embodiments set forth herein. Rather, these embodiments are provided to enable a more thorough understanding of the present disclosure, and to fully convey the scope of the present disclosure to those skilled in the art.

FIG. 1 is a flowchart of a photographic exposure method for a self-moving device according to an embodiment of the present application.

In this embodiment, the self-moving device includes a fill light and an image acquisition device such as a camera. The photographic exposure method for the self-moving device in this embodiment is applicable to a self-moving device with a camera, wherein the field of view of the camera faces forward. The light direction of the fill light is substantially consistent with the direction of the field of view of the camera. The fill light of the self-moving device may be an infrared light. The self-moving device is, for example, a ground mini-robot. This embodiment aims to provide an automatic exposure (AE) method that meets the fill-light conditions of a ground mini-robot. In view of the fact that the light emitted by a fill light of a near ground mini-robot is easily reflected by the ground and walls, an exposure region and weight selection in AE are optimized in this embodiment.

As shown in FIG. 1, in step S110, brightness information of a target region in an acquired image is detected based on a preset rule. A weighted average method may be used in brightness detection of the images acquired by the camera. FIG. 2 is a flowchart of step S110 in FIG. 1 according to an example of the present application.

Specifically, step S110 may further include the following steps.

In step S112, the target region in the acquired image is divided into sub-regions and brightness values of respective sub-regions are obtained. In an optional implementation, after dividing the target region in the acquired image into sub-regions, for each sub-region, the sub-region may be divided into a plurality of image blocks, and average brightness values of the respective image blocks may be obtained respectively; and brightness values of the respective sub-regions are obtained by weight-averaging the average brightness values of the respective image blocks with corresponding weight values of the respective image blocks.

Figures 3, 4:
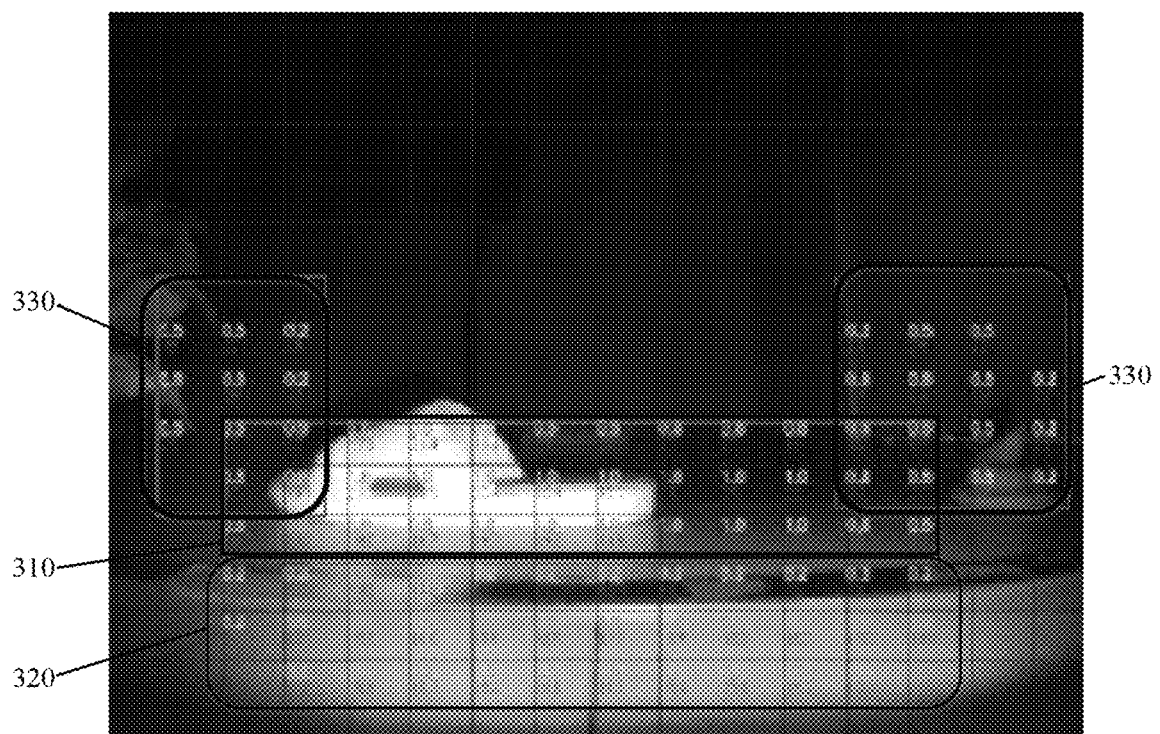
FIG. 3 is a schematic diagram of a target region in an acquired image according to an example of the present application.
FIG. 4 is a schematic structural diagram of a photographic exposure apparatus for a self-moving device according to another embodiment of the present application.

After the sub-region is further divided into a plurality of image blocks, the brightness values of the respective subregion are obtained by weight-averaging the average brightness values of the respective image blocks with corresponding weight values of the respective image blocks. A specific process of the weight-averaging may include: assuming that the number of effective image blocks in a certain sub-region is N, while the average brightness values of the respective image blocks are respectively I(x1, y1), . . . , and I(xN, yN), wherein x1, y1, . . . , and xN, yN are the coordinates of the respective image blocks respectively, and assuming that M(x1, y1), . . . , and M(xN, yN) are the weight values corresponding to the image blocks x1, y1, . . . , and xN, yN respectively, then the brightness value of the sub-region is L=[M(x1, y1)*I(x1, y1)+ . . . +M(xN, yN)*I(xN, yN)]/N. After performing automatic exposure, the image brightness values of respective image blocks are obtained separately, and weighted according to the corresponding weight values, so as to determine the final exposure parameter. The higher the weight value is, the greater the impact on the determination of the final exposure parameter is. The numbers in FIG. 3 are weight values corresponding to the respective image blocks.

In step S114, the brightness information is obtained by weight-averaging the brightness values of the respective sub-regions with corresponding weight values of the respective sub-regions. Since the target region in an image may include a reflective surface region and a space region, when dividing the target region in the acquired image, the target region may be divided according to the reflective surface region and the space region. Further, the reflective surface region may be divided into a ground region and a wall region. Here, the space region is located in the middle of the target region, and the reflective surface region is located on the left and right sides of the space region and/or below the space region (e.g., the reflective surface region is located on the left and right sides of the space region, the reflective surface region is located below the space region, or the reflective surface region is located on the left and right sides of the space region and below the space region). The weight value of the space region is greater than the weight value of the reflective surface region.

In an optional implementation, the weight value corresponding to the space region is greater than the weight value corresponding to the reflective surface region. Considering the influence of moving along the wall, the target region in the image may include a lower region of the image and raised regions on the left and right sides of the image in order to avoid overexposure, as shown in FIG. 3. In FIG. 3, a first region 310 is a region above the ground, and its weight value is higher; a second region 320 is a ground region, and its weight value is lower to avoid reflection; and third regions 330 are left and right wall regions, and their weight values are lower. Other regions are remote regions. The reason why the weight value of the first region 310 is selected to be greater than the weight value of the second region 320 and greater than the weight value of the third region 330 is that the ground and walls reflect light.

The preset rule here may be periodic or continuous, that is, it may be a rule of performing detection once for each of acquired images.

In step S120, in response to the detected brightness information not meeting a preset condition, a current exposure parameter is adjusted. Generally, automatic exposure (AE) is performed by using at least one of exposure time and exposure gain as an exposure parameter.

Specifically, assuming that the target brightness of the current scene is Lt, a brightness detection result L (i.e., the detected brightness information) is compared with the target brightness Lt. If the brightness detection result L<Lt, the exposure parameter is increased in the next exposure; and if the brightness detection result L>Lt, the exposure parameter is decreased in the next exposure.

In step S130, exposure is performed in a localized region during image acquisition based on the adjusted exposure parameter, and the localized region includes at least the target region.

According to the exposure gain and/or exposure time and image quality, it may be determined whether the image is in low illumination. When it is determined that the image is in low illumination, such as when the image is dark, the image may be acquired by local region automatic exposure (AE). The local region exposure means that a localized region is used as a reference region for exposure, and a size of the localized region may be selected according to a preset condition, for example, the region with numbers in FIG. 3 may be selected.

For video, the exposure parameter of the current frame is generally determined based on the brightness of the previous frame or several previous frames of the current frame. Specifically, the target region in the image of the previous frame or several previous frames may be divided into sub-regions to obtain brightness values of respective sub-regions; and the brightness information is obtained by weight-averaging the brightness values of the respective sub-regions with corresponding weight values of the respective sub-regions, respectively, the exposure parameter of the current frame is determined based on the brightness information, and exposure is performed in the localized region during a process of shooting the video based on the exposure parameter of the current frame.

It can be seen from the above embodiment that, by the photographic exposure method for the self-moving device in this embodiment, a weight value of the ground region is adjusted, so as to avoid the influence of ground reflection compared with the manner of using an equalized weight value. For example, if the ground is overexposed, the automatic exposure (AE) under a fill light will be affected, resulting in insufficient exposure gain and/or time relative to a detection region which may coincide with or approximate to the first region 310.

By the photographic exposure method for the self-moving device in the above-mentioned embodiments of the present application, a weight value of an edge wall is adjusted, so as to avoid the influence of overexposure of the wall reflection during movement along the wall. For example, if the wall is overexposed, AE under a fill light will be affected, resulting in insufficient exposure gain and/or time relative to a detection region which may coincide with or approximate to the first region 310.

Since these three parts (e.g., the first region 310, the second region 320, and the third regions 330) participate in the automatic exposure (AE) at the same time, in order to balance the sizes of the wall region and the ground region, the wall region should be raised by a certain height accordingly to avoid that the wall region seems too small.

The detection region may be coincident with or approximate to the first region 310, and a front-to-back distance of the detection region may range from 20 to 50 cm.

By the photographic exposure method for the self-moving device in the embodiment of the present application, in cases of high reflection along a wall and on the ground, AE under a fill light can still meet the needs for better object recognition.

According to the embodiments of the present application, the photographic exposure method for the self-moving device includes: detecting, based on a preset rule, brightness information of a target region in an acquired image; adjusting a current exposure parameter in response to the detected brightness information not meeting a preset condition; and performing, based on the adjusted exposure parameter, exposure in a localized region during image acquisition, the localized region including at least the target region.

Optionally, for the photographic exposure method for the self-moving device, adjusting the current exposure parameter in response to the detected brightness information not meeting the preset condition includes: comparing the brightness information with target brightness; increasing the exposure parameter in response to the brightness information being less than the target brightness; and decreasing the exposure parameter in response to the brightness information being greater than the target brightness.

Optionally, for the photographic exposure method for the self-moving device, detecting the brightness information of the target region in the acquired image includes: dividing the target region into sub-regions and obtaining brightness values of the respective sub-regions; and obtaining the brightness information by weight-averaging the brightness values of the respective sub-regions with corresponding weight values of the respective sub-regions.

Optionally, for the photographic exposure method for the self-moving device, dividing the target region into the sub-regions and obtaining the brightness values of the respective sub-regions includes: dividing the target region into the sub-regions, dividing each sub-region of the sub-regions into a plurality of image blocks, and obtaining average brightness values of the respective image blocks, respectively; and obtaining the brightness values of the respective sub-regions by weight-averaging the average brightness values of the respective image blocks with corresponding weight values of the respective image blocks.

Optionally, for the photographic exposure method for the self-moving device, the target region includes a reflective surface region and a space region, and dividing the target region into the sub-regions includes: dividing the target region into the reflective surface region and the space region, wherein the space region is located in a middle of the target region, and the reflective surface region is located on left and right sides of the space region and/or below the space region.

Optionally, for the photographic exposure method for the self-moving device, a weight value of the space region is greater than a weight value of the reflective surface region.

Optionally, for the photographic exposure method for a self-moving device, the exposure parameter includes exposure time and/or an exposure gain.

FIG. 4 is a schematic structural diagram of a photographic exposure apparatus for a self-moving device according to another embodiment of the present application. In this embodiment, the self-moving device includes a camera. As shown in FIG. 4, the photographic exposure apparatus 400 for the self-moving device provided in this embodiment includes an image brightness detection unit 410, an exposure parameter adjustment unit 420, and a local exposure unit 430.

The image brightness detection unit 410 is configured to detect, based on a preset rule, brightness information of a target region in an acquired image. The operation of the image brightness detection unit 410 may refer to the operation of step S110 described above with reference to FIG. 1.

The exposure parameter adjustment unit 420 is configured to adjust a current exposure parameter in response to the detected brightness information not meeting a preset condition. The operation of the exposure parameter adjustment unit 420 may refer to the operation of step S120 described above with reference to FIG. 1.

The local exposure unit 430 is configured to perform, based on the adjusted exposure parameter, exposure in a localized region during image acquisition. The operation of the local exposure unit 430 may refer to the operation of step S130 described above with reference to FIG. 1.

Figure 5:
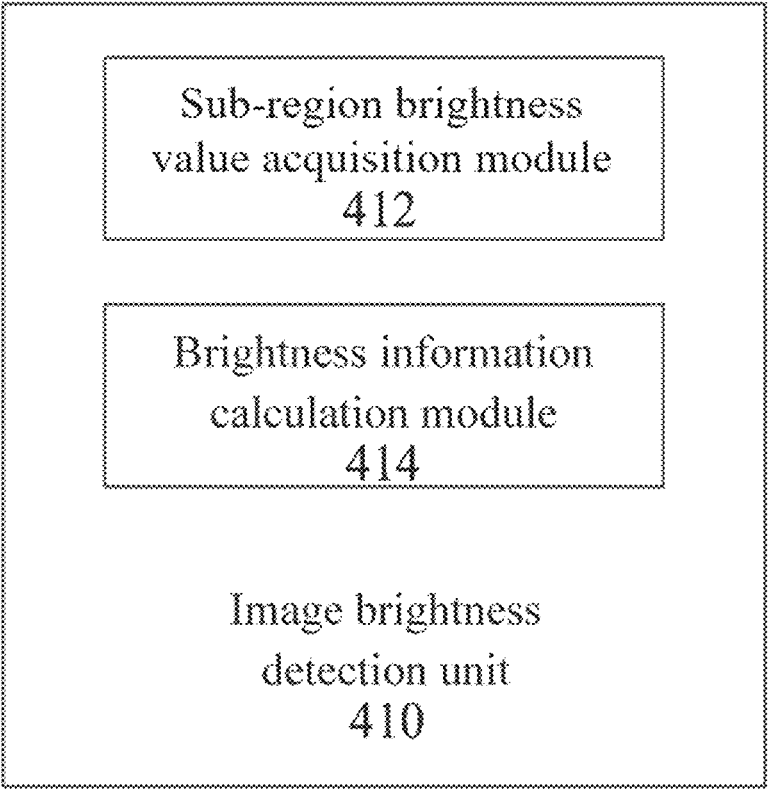
FIG. 5 is a schematic structural diagram of an image brightness detection unit in FIG. 4 according to an example of the present application.

FIG. 5 is a schematic structural diagram of the image brightness detection unit in FIG. 4 according to an example of the present application. As shown in FIG. 5, the image brightness detection unit 410 may include a sub-region brightness value acquisition module 412 and a brightness information calculation module 414.

The sub-region brightness value acquisition module 412 is configured to divide the target region into sub-regions and obtain brightness values of the respective sub-regions. The operation of the subregion brightness value acquisition module 412 may refer to the operation of step S112 described above with reference to FIG. 2.

The brightness information calculation module 414 is configured to obtain the brightness information by weight-averaging the brightness values of the respective sub-regions with corresponding weight values of the respective sub-regions. The operation of the brightness information calculation module 414 may refer to the operation of step S114 described above with reference to FIG. 2.

Further, the exposure parameter adjustment unit 420 may include a comparison module, an exposure parameter increasing module, and an exposure parameter decreasing module. The comparison module is configured to compare the brightness information with target brightness. The exposure parameter increasing module is configured to increase the exposure parameter in response to the brightness information being smaller than the target brightness. The exposure parameter decreasing module is configured to decrease the exposure parameter in response to the brightness information being larger than the target brightness.

Compared with the prior art, the main advantages of the technical solutions of the present application are as follows.

The photographic exposure method and apparatus for the self-moving device provided by embodiments of the present application enable the self-moving device to operate normally in insufficient-lighting or dark environments, so that in cases of high reflection along a wall and on the ground, automatic exposure (AE) under a fill light can still meet the needs for better object recognition.

Figure 6:
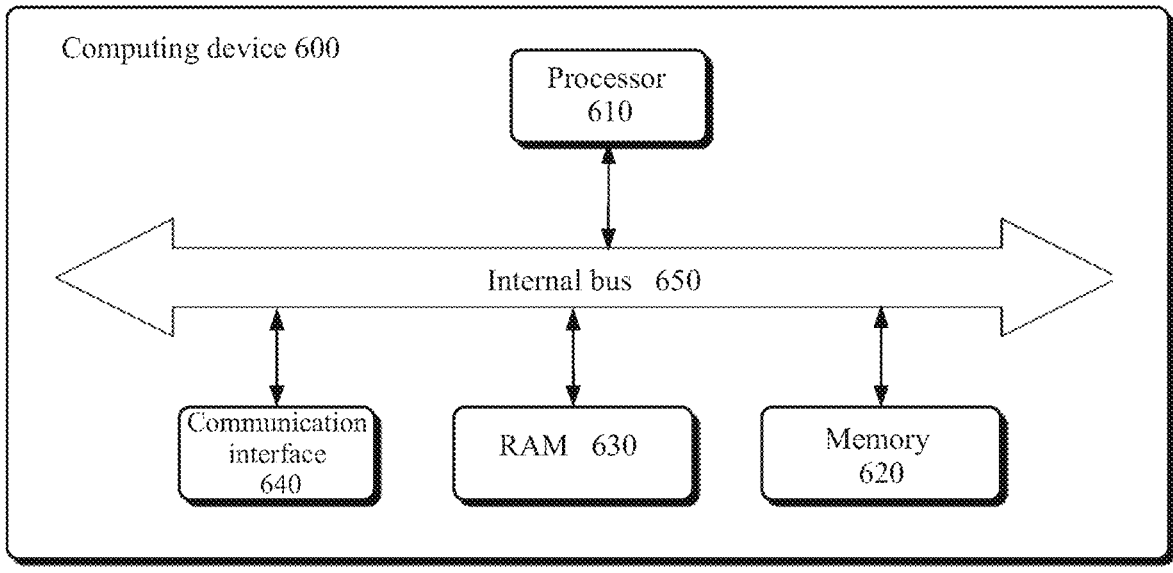
FIG. 6 is a structural block diagram of a computing device for photographic exposure for a self-moving device according to an embodiment of the present application.

FIG. 6 is a structural block diagram of a computing device for photographic exposure for a self-moving device according to an embodiment of the present application.

As shown in FIG. 6, the computing device 600 may include at least one processor 610, a memory 620, an RAM 630, a communication interface 640 and an internal bus 650; and the at least one processor 610, the memory 620, the RAM 630 and the communication interface 640 are connected together via the bus 650. The at least one processor 610 executes at least one computer-readable instruction (i.e., the above-mentioned elements implemented in software) stored or encoded in a computer-readable storage medium (i.e., the memory 620).

In one embodiment, computer-executable instructions are stored in the memory 620, and the instructions, when executed, cause the at least one processor 610 to: detect, based on a preset rule, brightness information of a target region in an acquired image; adjust a current exposure parameter in response to the detected brightness information not meeting a preset condition; and perform, based on the adjusted exposure parameter, exposure in a localized region during image acquisition, the localized region including at least the target region.

It should be understood that the computer-executable instructions stored in the memory 620, when executed, cause the at least one processor 610 to perform the various operations and functions described above in combination with FIGS. 1-5 in various embodiments of the present disclosure.

In the present disclosure, the computing device 600 may include, but is not limited to: a personal computer, a server computer, a workstation, a desktop computer, a laptop computer, a notebook computer, a mobile computing device, a smart phone, a tablet computer, a cellular phone, a personal digital assistant (PDA), a handheld device, a messaging device, a wearable computing device, a consumer electronic, and the like.

According to one embodiment, a program product, such as a non-transitory machine-readable medium, is provided. The non-transitory machine-readable medium may have instructions (that is, the above-mentioned elements implemented in software) that, when executed by a machine, cause the machine to perform various operations and functions described above in combination with FIGS. 1-5 in various embodiments of the present disclosure.

Specifically, a system or device equipped with a readable storage medium may be provided, on which a software program code for realizing the functions of any one of the above-mentioned embodiments is stored, and a computer or a processor of the system or device may read and execute instructions stored in the readable storage medium.

In this case, the program code itself read from the readable medium can realize the functions of any one of the above-mentioned embodiments, and thus, the machine-readable code and the readable storage medium storing the machine-readable code constitute a part of the present application.

Examples of the readable storage medium include a floppy disk, a hard disk, a magneto-optical disk, an optical disk (such as a CD-ROM, CD-R, CD-RW, DVD-ROM, DVD-RAM, DVD-RW and DVD-RW), a magnetic tape, a non-volatile memory card and a ROM. Alternatively, the program code may be downloaded from a server computer or cloud via a communication network.

The above descriptions are only embodiments of the present application, and are not intended to limit the protection scope of the claims of the present application. Any equivalent structure or equivalent process transformation made by using the Description of the present application and the contents of the accompanying drawings, or directly or indirectly applied to other related technical fields, are equally included in the protection scope of the claims of the present application.

What is claimed is:

1. A photographic exposure method for a self-moving device, comprising:

detecting, based on a preset rule, brightness information of a target region in an image, wherein detecting the brightness information of the target region comprises dividing the target region into sub-regions, obtaining brightness values of the respective sub-regions, and obtaining the brightness information by weight-averaging the brightness values of the respective sub-regions with corresponding weight values of the respective sub-regions, and wherein the target region comprises a reflective surface region and a space region, the space region is located in a middle of the target region, and the reflective surface region is located on left and right sides of the space region and/or below the space region;

adjusting an exposure parameter in response to the detected brightness information not meeting a preset condition; and performing, based on the adjusted exposure parameter, exposure in a localized region during image acquisition, the localized region comprising at least the target region.

2. The method of claim 1, wherein adjusting the exposure parameter in response to the detected brightness information not meeting the preset condition, comprises:

comparing the brightness information with target brightness;

increasing the exposure parameter in response to the brightness information being less than the target brightness; and decreasing the exposure parameter in response to the brightness information being greater than the target brightness.

3. The method of claim 1, wherein dividing the target region into the sub-regions and obtaining the brightness values of the respective sub-regions, comprises:

dividing the target region into the sub-regions, dividing each sub-region of the sub-regions into a plurality of image blocks, and obtaining average brightness values of the respective image blocks, respectively; and obtaining the brightness values of the respective sub-regions by weight-averaging the average brightness values of the respective image blocks with corresponding weight values of the respective image blocks.

4. The method of claim 1, wherein a weight value of the space region is greater than a weight value of the reflective surface region.

5. The method of claim 1, wherein the exposure parameter comprises at least one of: exposure time and an exposure gain.

6. A computing device, comprising:

one or more processors, and a memory coupled to the one or more processors, the memory storing instructions that, when executed by the one or more processors, cause the one or more processors to:

detect, based on a preset rule, brightness information of a target region in an image, wherein the one or more processors are further caused to divide the target region into sub-regions, obtain brightness values of the respective sub-regions, and obtain the brightness information by weight-averaging the brightness values of the respective sub-regions with corresponding weight values of the respective sub-regions, and wherein the target region comprises a reflective surface region and a space region, the space region is located in a middle of the target region and the reflective surface region is located on left and right sides of the space region and/or below the space region;

adjust an exposure parameter in response to the detected brightness information not meeting a preset condition; and perform, based on the adjusted exposure parameter, exposure in a localized region during image acquisition, the localized region comprising at least the target region.

7. The device of claim 6, wherein the memory storing instructions that, when executed by the one or more processors, cause the one or more processors to adjust the exposure parameter by:

comparing the brightness information with target brightness;

increasing the exposure parameter in response to the brightness information being less than the target brightness; and decreasing the exposure parameter in response to the brightness information being greater than the target brightness.

8. The device of claim 6, wherein the memory storing instructions that, when executed by the one or more processors, cause the one or more processors to divide the target region into the sub-regions and obtain the brightness values of the respective sub-regions by:

dividing the target region into the sub-regions, dividing each sub-region of the sub-regions into a plurality of image blocks, and obtaining average brightness values of the respective image blocks, respectively; and obtaining the brightness values of the respective sub-regions by weight-averaging the average brightness values of the respective image blocks with corresponding weight values of the respective image blocks.

9. The device of claim 6, wherein a weight value of the space region is greater than a weight value of the reflective surface region.

10. The device of claim 6, wherein the exposure parameter comprises at least one of: exposure time and an exposure gain.

11. A non-transitory machine-readable storage medium, wherein the machine-readable storage medium stores executable instructions that, when executed, cause a machine to perform a photographic exposure method for a self-moving device, comprising:

detecting, based on a preset rule, brightness information of a target region in an image, wherein detecting the brightness information of the target region comprises dividing the target region into sub-regions, obtaining brightness values of the respective sub-regions, and obtaining the brightness information by weight-averaging the brightness values of the respective sub-regions with corresponding weight values of the respective sub-regions, and wherein the target region comprises a reflective surface region and a space region, the space region is located in a middle of the target region, and the reflective surface region is located on left and right sides of the space region and/or below the space region;

adjusting an exposure parameter in response to the detected brightness information not meeting a preset condition; and performing, based on the adjusted exposure parameter, exposure in a localized region during image acquisition, the localized region comprising at least the target region.

12. The storage medium of claim 11, wherein adjusting the exposure parameter in response to the detected brightness information not meeting the preset condition, comprises:

comparing the brightness information with target brightness;

increasing the exposure parameter in response to the brightness information being less than the target brightness; and decreasing the exposure parameter in response to the brightness information being greater than the target brightness.

13. The storage medium of claim 11, wherein dividing the target region into the sub-regions and obtaining the brightness values of the respective sub-regions, comprises:

dividing the target region into the sub-regions, dividing each sub-region of the sub-regions into a plurality of image blocks, and obtaining average brightness values of the respective image blocks, respectively; and obtaining the brightness values of the respective sub-regions by weight-averaging the average brightness values of the respective image blocks with corresponding weight values of the respective image blocks.

14. The storage medium of claim 11, wherein a weight value of the space region is greater than a weight value of the reflective surface region.

* * * * *